United States Patent [19]
Sinnett et al.

[11] 3,981,465
[45] Sept. 21, 1976

[54] SUPINATING SEAT AND CONTROL DISPLAY FOR AIRCRAFT COCKPITS

[75] Inventors: James M. Sinnett, St. Louis; Leslie N. Edgington, Florissant; Carl F. Asiala, Hazelwood, all of Mo.

[73] Assignee: McDonnell Douglas Corporation, St. Louis, Mo.

[22] Filed: May 5, 1975

[21] Appl. No.: 575,047

[52] U.S. Cl. .................. 244/122 A; 244/122 R
[51] Int. Cl.² .................................... B64D 11/06
[58] Field of Search .......... 244/122 R, 122 A, 83 F, 244/86; 297/330, 322; 35/12 H, 12 E

[56] References Cited
UNITED STATES PATENTS

| | | | |
|---|---|---|---|
| 2,304,781 | 12/1942 | Dillon | 244/122 R X |
| 2,420,528 | 5/1947 | Eaton et al. | 244/86 X |
| 3,079,112 | 2/1963 | Campbell et al. | 244/122 R |
| 3,098,631 | 7/1963 | Hall et al. | 244/122 R |
| 3,580,636 | 5/1971 | Setto | 244/83 F |
| 3,826,434 | 7/1974 | Von Beckh | 244/122 R |

*Primary Examiner*—Stephen G. Kunin
*Assistant Examiner*—Barry L. Kelmachter
*Attorney, Agent, or Firm*—Gravely, Lieder & Woodruff

[57] ABSTRACT

A supinating seat for aircraft cockpit which is articulated to improve pilot physiological and cognitive capability in high acceleration maneuvers of the aircraft, and which seat does not interfere with rapid ejection or displacement of the controls from pilot convenience of operation, or interfere with a full view of the instrument display.

14 Claims, 10 Drawing Figures

SUPINATING SEAT AND CONTROL DISPLAY FOR AIRCRAFT COCKPITS

BACKGROUND OF THE INVENTION

This invention relates to improvements in supinating seat and control display arrangements for aircraft cockpits, and especially for high performance aircraft.

Heretofore, it has been recognized that pilots of high performance aircraft have an upper limit of physiological and cognitive capability when seated in the usual generally erect position. With available knowledge about the pilot limitations supinating pilot's seats of the character shown in U.S. Pat. to Hall et al, No. 3,098,631 of July 23, 1963 have been proposed. The Dillon U.S. Pat. No. 2,304,781 of Dec. 15, 1942 has proposed a form of pilot's seat for military aircraft which responds to the release of a bomb for reclining the pilot and any crew members during pull-up from a bomb run. A very recent proposal is disclosed by Von Beckh in U.S. Pat. No. 3,826,434 of July 30, 1974 which disclosed a pilot's seat positionable in either a normal sitting or a supine position.

Current fighter aircraft possess maneuvering performance capabilities which challenge pilot physiological and cognitive capabilities from the standpoint of both maximum limit G tolerance and fatigue at intermediate maneuvering G. levels. Today's fighters enable the frequent and repeated use of load factor, at will, in the air combat maneuvering environment. When seated in an upright position, from back angles of 10° (normal position) through about 45°, pilot load factor tolerance degrades substantially. This occurs as a function of load factor magnitude, time at load factor levels, and frequency of repeated load factor application. The use of extensive high G training (physiological straining and muscular control) and anti-G suits have been found to offer some improvement but cannot match the aircraft capability without compromising the pilot's ability to effectivey think, command, and control his aircraft. Prior centrifuge and research airplane work has verified that substantial improvements in pilot load factor tolerance and performance can be realized through repositioning of the pilot so that aircraft load factor is applied in a transverse direction. The mechanism for accomplishing this in the cockpit is a reclining or supinating seat. However, previously adapted reclining seats severely impaired pilot control and visual capability, and were not amenable to aircraft ejection escape provisions.

The cockpit characteristics of this invention may include the use of an articulating ejection seat with cockpit concepts utilizing multi-purpose displays, fly-by-wire and throttle-by-wire control technology. Integrations of the control-display technology, digital computation capabilities, and gyro-stabilized rocket ejection systems make integration of an effective articulating seat and compatible cockpit arrangement practicable and feasible. While the principal component is the articulating seat, enabling pilot repositioning for G protection, and which seat may be rejectable, equally important cockpit features that complement use of the improved seat, are primary flight controller and throttle placement to provide continual access and use for all seat positions. Included are the recessed forward control instrument display areas to provide display capabilities compatible with seat position, and to allow comfortable rudder pedal access for all seat positions. The novel features of the presently preferred embodiment include adjustability of seat-to-back from a shoulder-pivot location which lifts and reclines the body within the cockpit to provide a protective position with respect to the aircraft applied G vector, opening the seat bucket angle during seat articulation to provide rudder pedal access, and introduction of cockpit control-display recessed panels to provide usable and effective cockpit integration. Compatibility of head support and controller integration arrangement renders the embodiment fully usable, while use of a shoulder located pivot enables adaptation to existing ejection seats and facilitates simplified seat construction without compromising basic seat structure and ejection performance.

An important object of the present invention is to provide a supinating seat and control instrument display for high performance aircraft which combines an instrument display panel having openings to accommodate the pilot's feet and legs, seat mounting provisions spaced from the display panel, and a pilot's seat carried by the mounting structure and including a seat bottom and a seat back which are pivotly interconnected and supported at a shoulder height pivot so as to be movable between a normal seated position and a position in which the pilot's body is raised from the shoulder area into a position substantially transversed to the direction of the resultant acceleration vector.

It is a further important object of this invention to provide a pilot's supinating seat for an aircraft having high performance characteristics to provide for positional adjustment of the seat from the shoulder height of the pilot without affecting the position of the pilot's head so as to avoid impairing the pilot's vision with respect to the outside world and important instrumentation.

Yet another object of this invention is to provide a vehicle, such as an aircraft or the like, with a novel combination of a seat assembly of adjustable character carried on fixed support structure and spaced from instrumentation display panels, and to arrange the combination so that a person positioned in the seat assembly will have visual access to the display panels and will also be in convenient reach of manipulative components, such as pedals and levers, to the end that the vehicle can be managed and directed as desired for whatever seat adjustment is selected.

Other objects and advantages for the present invention will be hereinafter more particularly described in connection with the disclosure of the supinating seat and control display for aircraft cockpits.

BRIEF DESCRIPTION OF THE DRAWINGS

The embodiments of the present invention is shown in the accompanying drawings, wherein.

DESCRIPTION OF THE SUPINATING SEAT EMBODIMENTS

Figure 1:
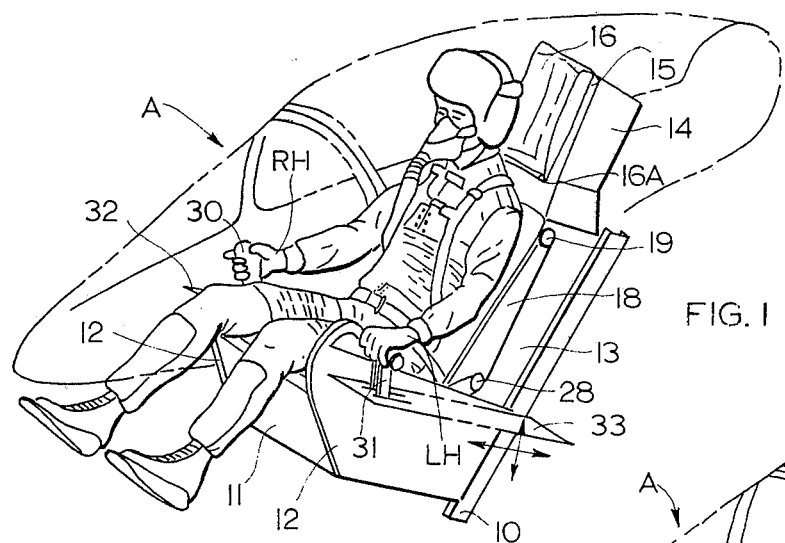
FIG. 1 is a perspective view of the supinating seat assembly with the pilot controls located adjacent the seat assembly.

In FIGS. 1 to 4, the supinating seat assembly is seen to be carried in the aircraft cockpit A on a mounting support structure which may be structure which includes an ejection track 10 (one track rail being seen) which is normally fixed to a bulkhead structure in the aircraft cockpit (not shown). The seat assembly is structured so that no part moves rearwardly of the ejection track 10. Accordingly, the seat is made up of a seat pan 11 supported between sides 12. The seat sides 12 are joined to a vertically extending box-like back frame mounting support 13 which, in turn, is surmounted by a parachute container 14 having a front wall 15 which supports a head cushion 16 hingedly connected to the front wall 15 at hinge 16A. The forward adjustment of this cushion 16 is shown in dotted outline. The seat sides 12 and back frame are attached (FIG. 6) by suitable means, such as with rollers R, to the track 10. Means, not necessary to show, is provided for adjusting the back frame and seat sides along the track 10 to suit the physical requirements of the pilot. The upper and lower limits of this adjustment is indicated by dotdash lines.

Figure 5:
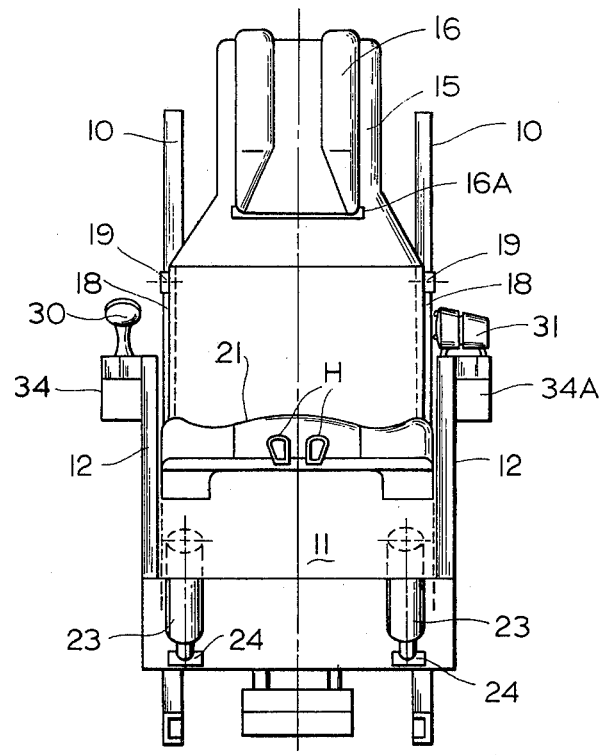
FIG. 5 is a front view looking into the pilot's seat when in its normal position.
Figure 6:
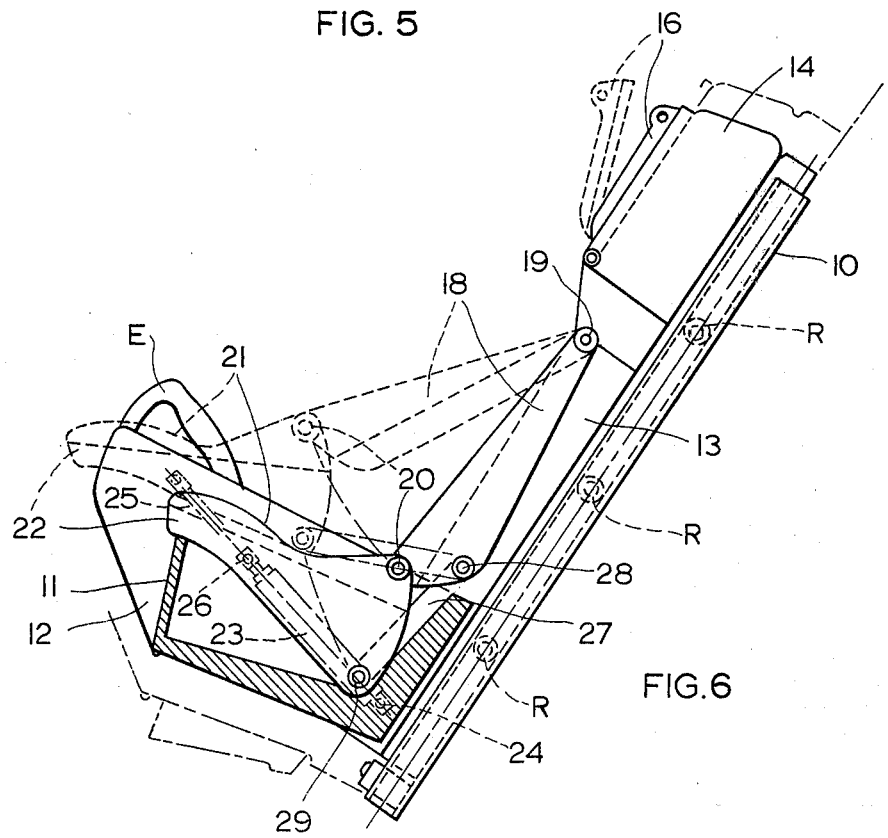
FIG. 6 is an enlarged and partly sectioned side view of the pilot seat showing the seat and back cushion in normal position in full line, and in the high acceleration position in dotted outline.

The seat assembly above described is provided with a cushioned back and seat bottom, FIGS. 5 and 6, in which the back cushion carrying frame 18 is connected to the back frame 13 at a shoulder height hinge 19. The lower end portion of the back cushion frame 18 is connected by hinge 20 to the rearward portion of a seat bottom 21 which fits within the pan 11 such that its forward margin 22 rests on the upper edge of the pan as seen in FIG. 6. The seat assembly includes a pair of supinating thrusters 23 which are pivotally secured at 24 to the inner surfaces of the sides 12. The actuating rods 25 of the thrusters are connected at 26 to the underside of the forward portion of the seat bottom 21. When the thrusters are retracted the seat bottom 21 is in the full line position, and that simultaneously locates the frame 18 in the full line position. The desired motion of the seat bottom 21 and frame 18 is obtained by control means which are a pair of links 27. These links 27 are connected to the back frame 13 at pivots 28 and are connected to the lower rear portion of the seat bottom at pivots 29.

The assembly of FIGS. 5 and 6 shows the seat back frame 18 and the seat bottom 21 in full line for the normal erect seating position for a pilot, and in dotted outline in the pilot supinating position wherein the pilot's head remains in the forward viewing position (FIGS. 2 and 4) while the body is moved from the shoulder area into a supinating position with the body and upper legs raised to a reclining position with respect to the direction of the aircraft applied acceleration field. In causing the pilot's body to recline by lifting, the seat back and bottom are moved relative to the seat frame portions 12 and 13, and there is no portion of the seat assembly that is permitted to pass rearwardly across the line of the ejection tracks. The important function of the motion control link 27 is to cause the seat bottom 21 to open its angular relationship to the seat back by swinging the forward margin 22 down so there will be no obstruction imposed on the freedom of the pilot to reach and operate the rudder pedals. Also, the seat bottom presents support for the pilot's thighs and is retained at an angle to the back so that there is a restraint offered to keep the pilot from sliding forward out of the seat bottom. The usual harness seen in FIGS. 1 to 4 prevents leaving the seat for this and other direction of possible movement.

Figure 2:
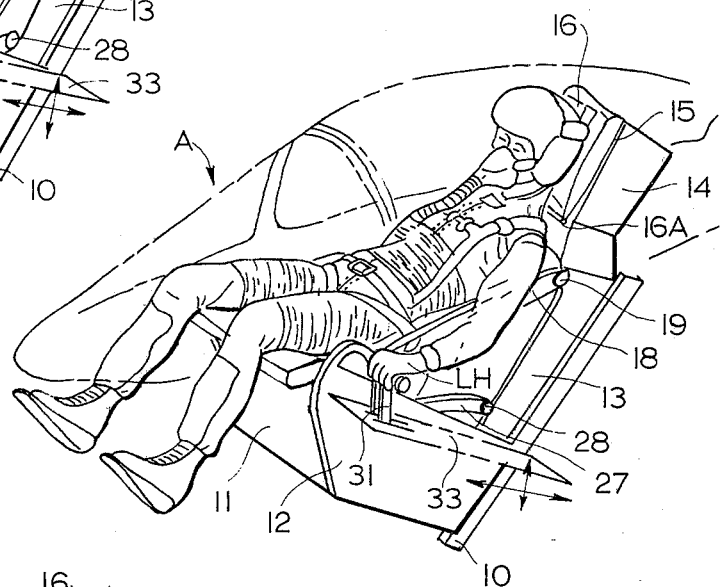
FIG. 2 is a view similar to FIG. 1, but showing the seat in its high acceleration position.
Figure 3:
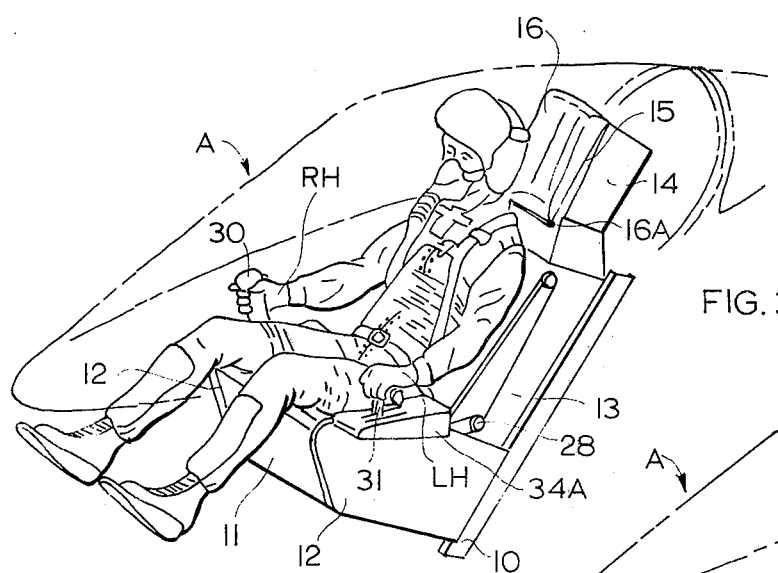
FIG. 3 is a view similar to FIG. 1, but showing the pilot controls mounted in the arm rest for the seat.
Figure 4:
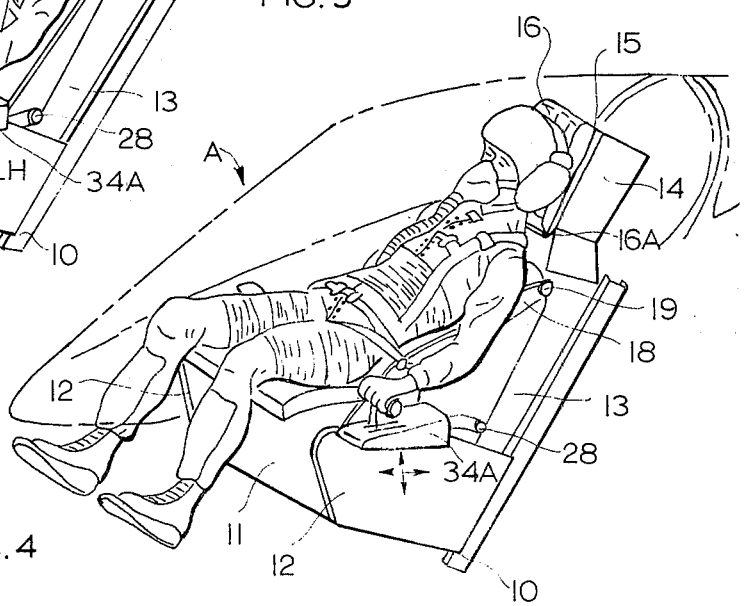
FIG. 4 is a view similar to FIG. 3 but showing the seat in its high acceleration position.

Referring again to FIGS. 1 and 2, and also FIGS. 3 and 4, it is seen that in FIGS. 1 and 2 the pilot's right hand RH is in position to grasp the flight controller 30, and the left hand LH is in position to grasp the throttle lever 31. This is the same for the erect seated position as well as the reclining or supinating position. These right and left controls are operatively mounted in panels 32 and 33 which are not mounted on the seat side 12, and it is indicated by arrows that these controls and panels may be adjusted in the vertical and longitudinal directions of the cockpit. On the other hand, the views of FIGS. 3 and 5 illustrate a modification in which the flight controller 30 is carried by a support 34 on the side 12 of the seat and throttle lever 31 is operatively carried in a support 34A attached to the opposite side 12. The difference is that on ejection of the seat assembly of FIGS. 3 and 4 the components 30 and 31 are carried out of the cockpit with the seat assembly. These supports 34 and 34A may be adjusted vertically as well as longitudinally of the seat as indicated by the arrows.

FIGS. 1, 2 and 6 show the seat assembly with ejection handles E, one on the right hand side not being visible except in FIG. 6. When the flight controller 30 and throttle 31 are mounted as seen in FIGS. 3, 4 and 5, the ejection handles are replaced with ejection handles H located in FIG. 5 at the front of the seat bottom between the pilot's legs.

Figure 7:
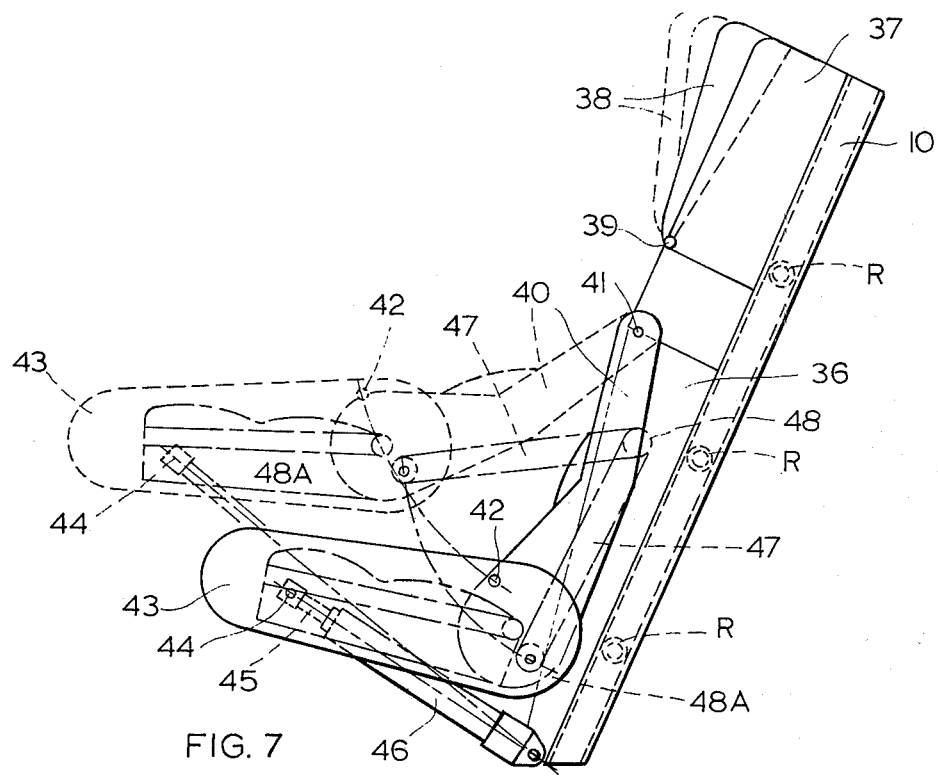
FIG. 7 is a modification of the supinating seat shown in its normal position in full line and in its high acceleration position in broken line.

FIG. 7 discloses a modified seat assembly operatively carried on the ejection tracks 10. In this arrangement the seat frame 36 has rollers R engaged in the tracks 10, and the parachute pack is carried in the upper container 37 of the frame behind a head cushion 38 which is adjustable about a hinge 39 to suit the pilot as shown in full and dotted outline. A back cushion carrying frame 40 is hinged at 41 to the frame 36 and extends downwardly to connect at hinge 42 to the rearward portion of a cushion carrying seat bucket 43. The forward portion of the bucket 43 is supported at pivot 44 on the extension rods 45 of thrusters 46 supported at the lower end of the frame 36. The control over the movement of the seat bucket 43 and back frame 40 is obtained by the link 47 pivoted at 48 in the frame 36 and connected to the lower rear portion of the seat bucket at 48. The normal seated position for the assembly of FIG. 7 is shown in full line, and the reclining or supinating position is shown in dotted outline. When in the supinated position the movement of the back frame 40 takes place at the shoulder height pivot 41, and the motion control link 47 (there are a pair of these links but only one is shown) causes the seat bucket 43 to move upwardly and forwardly to open the angle with the back frame 40.

Figure 8:
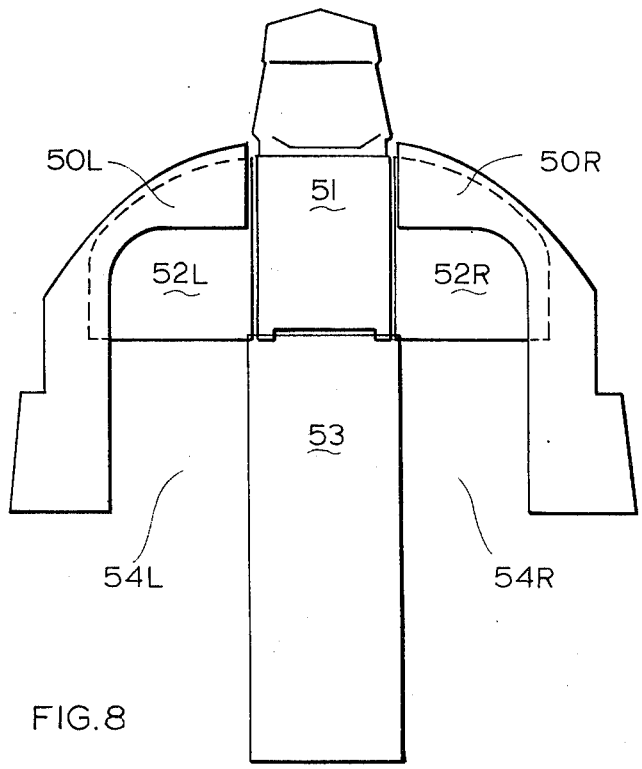
FIG. 8 is a view from the pilot's seat showing the instrument panel configuration and the leg and knee recesses for access to the foot operated pedals.
Figure 9:
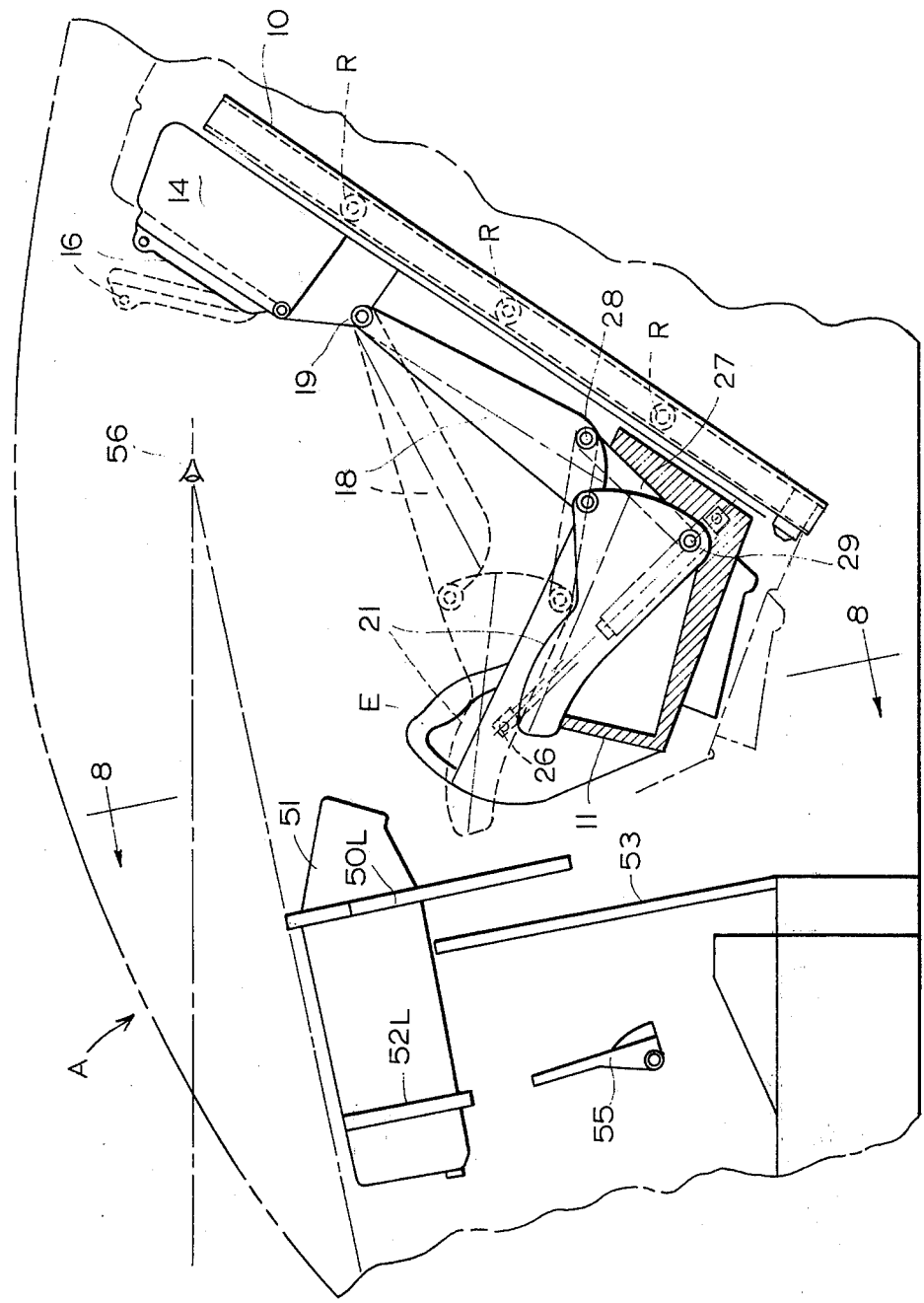
FIG. 9 is a diagrammatic side view of the cockpit arrangement of panels and console, and rudder pedals for the erect and reclining positions of the seat assembly shown in FIG. 6.

The views of FIGS. 8 and 9 are diagrammatic of the relationship and cooperation achieved between the supinating pilot's seat, for example the seat of FIG. 6, and the cockpit instrumentation carrying panels of FIG. 8. For example, when seated in the seat assembly of FIG. 6 in the normal erect position, the pilot will be in full observation of the principal instrument panels 50R and 50L arranged at each side of a center hooded component 51. Forward of the panels 50R and 50L are recessed panels 52R and 52L, and below the component 51 is the center instrument console 53. There are recesses 54R and 54L at each side of the console 53 to permit the pilot to place his feet and legs so the feet can comfortably reach the rudder pedals 55. It can be seen in FIG. 9 that the reclined position of the seat assembly places the seat bottom 21 adjacent the principal panel 50L but there is sufficient room for the legs to clear the panel and remain on the rudder pedal 55. The pilot's legs in the respective recesses 54R and 54L do not obscure the principal panels 50R and 50L from the pilot's eye position represented at 56. It is seen also that the rudder pedals do not move with the seat.

The foregoing description has set forth the features of a supinating seat and control instrument display for pilots of high performance aircraft. It is especially important to protect the pilot from high G load factors so that the pilot's physiological well being and comfort, and ability to maneuver the aircraft are provided for. In this arrangement it is shown that the pilot has visual, command and control of the necessary flight functions in either position and the seat position at no time crosses beyond the ejection tracks so that a rapid ejection escape is maintained. As shown, the flight controller 30 and the engine throttle control 31 are operatively mounted either in the cockpit (FIGS. 1 and 2) or on the seat (FIGS. 3 and 4), but in either mounting the pilot retains a comfortable arm and hand position which preserves the reach for all usable seat positions. The positioning of the seat assembly by the thrusters 23 or 46 is under control of the pilot through a suitable directional switch on the flight controller 30 which governs the supply or exhaust of motive fluid to the cylinders of these thrusters, and allows for infinite positioning of the seat back and seat bottom relation.

Figure 10:
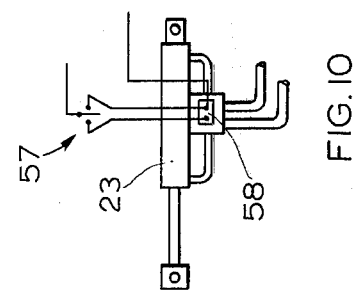
FIG. 10 represents the general type of control for the seat positioning thrusters seen in FIGS. 5, 6 and 7.

In FIG. 10 there is seen a representative hook-up for a thruster 23 which is caused to move in reverse directions by the direction of pilot movement of button switch 55 on the flight controller. This switch 57 activates valve 58 to supply motive fluid to one end or the other of the thruster and exhaust the fluid from the opposite end. The motive fluid is supplied from the aircraft system which is well understood. While motive fluid thrusters are shown, electro-mechanical screw jacks may be used for the thrusters 23 and 46.

The disclosure has included a seat assembly in which FIG. 6 shows the cushioned liners for the seat frame to be adjusted between the normally erect position of about 65° to the vertical of the aircraft, where the seat back to seat bottom angle is of the order of from 97° to 105°, and the reclined position where the seat and back are opened up to an angular relation not greater than about 160° so the pilot does not slide forward on the seat bottom. It can be seen in FIG. 9 that the pilot does not lose the ability to manipulate the rudder pedals 55, which do not move, or to see principal portions of instrument panels 50, 52 and 53, nor does the pilot lose the ability to reach panels 50 and 51.

It can now be appreciated that the challenge to pilots operating high performance aircraft in an efficient and safe manner has been improved by protecting the pilots through pivoting the pilot's body from the shoulder elevation into a reclining position substantially transverse to the aircraft applied acceleration. In positioning the pilot in this reclining position the seat bottom liner or bucket is opened so there will be no interference with the normal operation of the rudder pedals, as well as no blocking the view of the principal instrument panels.

What is claimed is:

1. A supinating seat and control instrument display for an aircraft pilot comprising in combination: instrument display panel means accommodating the pilot's feet and legs; rudder pedals in the aircraft in fixed position spaced below said display panel means; a seat mounting support in the aircraft spaced from said pedals and from said panel means; a pilot's seat carried by said mounting support in position facing said panel means, said seat having a seat bottom with front and rear margins, a seat back having upper and lower margins, a first pivotal connection between said rear margin and said lower margin, a second pivotal connection between said upper margin and said mounting support, head support means carried by said seat above said upper margin, reversible seat adjusting means connected between said mounting support and said front margin and operable to move said seat bottom and seat back between seat upright and seat supinated positions, said front margin moving relative to said pedals and toward said panel means but short of obstructing said panel means to accommodate the feet and legs of the pilot and said seat back moving about said second pivot relative to said head support means; and seat bottom to seat back angle control means connected between said mounting support below said second pivot connection and said seat bottom below said first pivot connection, said control means being operable to increase the seat bottom to seat back angle upon operation of said seat adjusting means toward seat supinating position and to decrease such angle in the seat upright position upon reverse operation of said seat adjusting means.

2. The combination set forth in claim 1 wherein said seat mounting support includes a liner portion carrying said seat bottom and a liner portion carrying said seat back, said first pivotal connection being between said liner portions and said second pivotal connection being between said liner portion for said seat back and said mounting support.

3. The combination set forth in claim 1 wherein said seat bottom to seat back angle in the seat upright position is of the order of 97° to 105° and in the seat supinating position is of the order of not greater than about 160°.

4. The combination set forth in claim 1 wherein said seat back has its upper margin substantially at the shoulder elevation of a pilot when seated on said seat bottom, and said second pivotal connection is substantially at said shoulder elevation of said upper margin.

5. A supinating seat and control instrument display for pilots of aircraft comprising in combination: instrument display panel means accommodating the pilot's feet and legs; a seat mounting support in the aircraft spaced from said panel means; a pilots seat carried by said mounting support in position facing said panel means, said seat having a seat bottom with front and rear margins, a seat back having upper and lower margins, a first pivotal connection between said rear margin and said lower margin, and second pivotal connection between said upper margin and said mounting support, reversible seat adjusting means connected between said mounting support and said front margin and operable to move said seat bottom and seat back between seat upright and seat supinated positions, said seat bottom in the seat supinated position having a lesser slope with respect to the seat back than the slope of the seat bottom when in the seat upright position, said seat including a pilot head rest carried by said mounting support above said seat back, and seat bottom to seat back angle control means connected between said mounting support below said second pivot connection and said seat bottom below said first pivot connection, said control means being operable to increase the seat bottom to seat back angle upon operation of said seat adjusting means toward seat supinating position and to decrease such angle in the seat upright position upon reverse operation of said seat adjusting means.

6. A supinating seat and control instrument display for pilots of aircraft comprising in combination: instrument display panel means accommodating the pilot's feet and legs, a seat mounting support in the aircraft spaced from said panel means and including an ejection track fixed in position, a pilot's seat carried by said mounting support in position facing said panel means, said seat having a seat bottom with front and rear margins, a seat back having upper and lower margins, a first pivotal connection between said rear margin and said lower margin, a second pivotal connection between said upper margin and said mounting support, reversible seat adjusting means connected between said mounting support and said front margin and operable to move said seat bottom and seat back relative to said ejection track upon operation of said reversible seat adjusting means, a head rest carried by said mounting support in substantially fixed position to retain the pilot's head in position to view said panel means in adjusted positions of said seat bottom to seat back angles, and seat bottom to seat back angle control means connected between said mounting support below said second pivot connection and said seat bottom below said first pivot connection, said control means being operable to increase the seat bottom to seat back angle upon operation of said seat adjusting means toward seat supinating position and to decrease such angle in the seat upright position upon reverse operation of said seat adjusting means.

7. The supinating seat and control instrument display set forth in claim 6, wherein said combination includes a flight controller, a throttle controller, and means operatively supporting said flight and throttle controllers adjacent and in positions fixed with respect to said seat, and each in a position of access by a pilot in and between any of said seat positions.

8. The pilot supinating seat set forth in claim 7 wherein said supporting means for the flight and throttle controllers is affixed to said seat.

9. A pilot supinating seat for aircraft having an elongated fixed support in the aircraft, said seat comprising a principal seat frame carried by the fixed support and extending above the shoulder elevation of the pilot, a pilot's head support carried by the upper portion of said principal frame, a seat back normally aligned with said head support and having an upper margin pivotally connected to said principal frame adjacent the shoulder elevation of the pilot, a seat bottom having a rear portion pivotally connected to said seat back adjacent the lower margin thereof, said seat bottom having a forward margin, seat supinating means supported by the lower portion of said principal frame and extending below said seat bottom and into operative connection with said forward margin of said seat bottom to exert a force thereon to move said seat into and out of a pilot supinating position, and seat motion control means operatively connected between said principal frame and said seat bottom and effective to swing said seat bottom rear portion upwardly in cooperation with pivotal motion of said seat back about said upper margin pivotal connection, said head support being held by said principal frame against movement with said seat back.

10. The pilot supinating seat set forth in claim 9 wherein said seat back, seat bottom and head support are confined to positions in front of said principal seat frame, said frame is relatively movable in a direction along said fixed support, and said fixed support is a seat ejection track.

11. The pilot supinating seat set forth in claim 9 wherein said seat bottom includes fixed side frames connected to said principal frame carried by said fixed support, a seat pan operatively carried by said side frames and seat bottom cushion means supported at said pivotal connection to said seat back and by both said seat supinating means and said seat motion control means.

12. The pilot supinating seat set forth in claim 9 wherein said seat supinating means and seat motion control means combine to cause said seat bottom to elevate and pivot said seat back about said upper margin.

13. In an aircraft: a cockpit; and pilot accommodations in said cockpit which comprise, an ejection rail and rail support in said cockpit, a seat assembly carried by said ejection rail and having a seat back and a seat bottom pivotally interconnected, said seat back being pivotally connected to said ejection rail, means connected between said ejection rail and said seat bottom and operable to move said seat bottom away from said ejection rail and simultaneously move said seat back about its pivotal connection; and flight instrumentation panel means in said cockpit presented to the pilot in spaced relation from said seat assembly, said seat bottom movement away from said ejection rail supinating the pilot relative to said flight instrumentation panel means.

14. The aircraft set forth in claim 13 wherein the pilot accommodations include rudder pedals mounted in fixed position below said flight instrumentation panel means, and said flight instrumentation panel means is arranged to form recesses aligned with said pedals and of a size to allow free passage of the pilot's feet and legs.

* * * * *